US007248567B2

(12) United States Patent
Desgagné et al.

(10) Patent No.: US 7,248,567 B2
(45) Date of Patent: Jul. 24, 2007

(54) METHOD AND SYSTEM FOR INTEGRATING RESOURCE ALLOCATION BETWEEN TIME DIVISION DUPLEX AND FREQUENCY DIVISION DUPLEX IN WIRELESS COMMUNICATION SYSTEMS

(75) Inventors: Michel Desgagné, St. Hubert (CA); Teresa Joanne Hunkeler, Montreal (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 87 days.

(21) Appl. No.: 10/828,665

(22) Filed: Apr. 21, 2004

(65) Prior Publication Data

US 2004/0264393 A1 Dec. 30, 2004

Related U.S. Application Data

(60) Provisional application No. 60/464,668, filed on Apr. 22, 2003.

(51) Int. Cl.
*H04B 7/00* (2006.01)
(52) U.S. Cl. ........................ 370/277; 370/478
(58) Field of Classification Search ............... 370/276, 370/277, 278, 280, 281, 294, 295
See application file for complete search history.

(56) References Cited

U.S. PATENT DOCUMENTS

| 5,881,369 | A | * | 3/1999 | Dean et al. | 455/78 |
| 5,926,466 | A | * | 7/1999 | Ishida et al. | 370/280 |
| 5,987,010 | A | * | 11/1999 | Schnizlein | 370/280 |
| 6,094,421 | A | * | 7/2000 | Scott | 370/280 |
| 6,130,897 | A | * | 10/2000 | Ishida et al. | 370/478 |
| 6,456,826 | B1 | * | 9/2002 | Toskala et al. | 455/63.1 |
| 2001/0012283 | A1 | | 8/2001 | Miya et al. | |
| 2001/0022782 | A1 | | 9/2001 | Steudle | |
| 2001/0055288 | A1 | | 12/2001 | Uebayashi et al. | |
| 2002/0037749 | A1 | * | 3/2002 | Wager | 455/561 |
| 2002/0049062 | A1 | * | 4/2002 | Petersen | 455/453 |
| 2002/0105913 | A1 | * | 8/2002 | Miya | 370/241 |
| 2002/0173277 | A1 | * | 11/2002 | Takao et al. | 455/77 |
| 2002/0173329 | A1 | | 11/2002 | Hwang | |
| 2003/0081592 | A1 | * | 5/2003 | Krishnarajah et al. | 370/352 |
| 2003/0176195 | A1 | * | 9/2003 | Dick et al. | 455/455 |
| 2004/0203786 | A1 | * | 10/2004 | Ishiguro et al. | 455/436 |

FOREIGN PATENT DOCUMENTS

| EP | 0975184 | 7/1998 |
| EP | 1 077 582 A1 | 2/2001 |
| EP | 1202593 | 6/2001 |
| WO | 99/38343 | 7/1999 |

\* cited by examiner

*Primary Examiner*—Bob A. Phunkulh
(74) *Attorney, Agent, or Firm*—Volpe and Koenig, P.C.

(57) ABSTRACT

The present invention integrates resource allocation between time division duplex (TDD) and frequency division duplex (FDD) in wireless communication systems. A radio network controller (RNC) receives a radio access bearer (RAB) request from a core network or a wireless receive/transmit unit. The RNC utilizes a TDD-FDD selector to assign radio resources in response to the request. The TDD-FDD selector evaluates various parameters regarding the received RAB request and determines whether it is preferable to assign TDD resources or FDD resources and whether such resources are currently available. Once resources are assigned, system conditions are evaluated to determine whether optimizations may be made to a current resource allocation.

11 Claims, 5 Drawing Sheets

METHOD AND SYSTEM FOR INTEGRATING RESOURCE ALLOCATION BETWEEN TIME DIVISION DUPLEX AND FREQUENCY DIVISION DUPLEX IN WIRELESS COMMUNICATION SYSTEMS

CROSS REFERENCE TO RELATED APPLICATION(S)

This application claims priority from U.S. Provisional Application No. 60/464,668 filed on Apr. 22, 2003 which is incorporated by reference as if fully set forth.

FIELD OF INVENTION

The present invention is related to wireless communication systems. More particularly, the present invention relates to integrating resource allocation between time division duplex (TDD) and frequency division duplex (FDD) in wireless communication systems.

BACKGROUND

Wireless communication systems are well known in the art. In order to provide global connectivity for wireless systems, standards have been developed and are being implemented. One current standard in widespread use is known as Global System for Mobile Telecommunications (GSM). This is considered a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless communication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs and access points, is to provide a wireless connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the Internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on the current location of subscribers. The gateway mobile services switching center also receives and administers connection requests from subscribers to external networks.

The RNCs generally control internal functions of the UTRAN. The RNCs also provide intermediary services for communications having a local component via a Uu interface connection with a Node B and an external service component via a connection between the CN and an external system, for example overseas calls made from a cell phone in a domestic UMTS.

Typically an RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In communication systems such as Third Generation Partnership Project (3GPP) Time Division Duplex (TDD) and Frequency Division Duplex (FDD) systems, multiple shared and dedicated channels of variable rate data are combined for transmission. Background specification data for such systems are publicly available and continue to be developed.

Almost all wireless communication systems use two different channels for UL and DL traffic. In TDD type systems, UL and DL channels exist in the same frequency band. Separation between the UL and DL channels occurs in the time domain. Therefore, for a particular frequency carrier, the particular link direction of that frequency carrier alternates between UL and DL depending on whether UL or DL traffic is currently being handled on that single frequency carrier. In contrast, in FDD type systems, two frequency bands are used for UL and DL connections. Most systems, including conventional cordless phones, North American cellular radios, microwave point-to-point radios and satellite systems implement FDD type technology.

With the development of wireless communication systems, the type of traffic carried over such systems has developed to not only include voice communications, but also various types of data transmissions. For example, multimedia data transmissions over wireless communication systems often result in asymmetric traffic load between UL and DL connections. Additionally, there is increasing overlap in coverage areas wherein both a TDD type system and a FDD type system are available to wireless users.

As is known to those skilled in the art, in TDD type systems, the number of UL channels and DL channels may be dynamically adjusted in accordance with traffic conditions at a particular time and place. Therefore, TDD type systems are better suited to handle asymmetrical (or otherwise unbalanced) traffic having high data rates. FDD systems, however, have an advantage over TDD type systems in that FDD systems are better suited for handling constant data rate services having low to moderate data rates such as voice traffic because of the predetermined allocation of UL and DL resources.

Radio resource management between TDD type systems and FDD type systems is individually performed in each system type according to their own allocation methods. This arrangement precludes potential optimizations that may be achieved by integrating resource allocation between time division duplex (TDD) and frequency division duplex (FDD) in wireless communication systems. There is a need therefore to integrate radio resource management between TDD and FDD in wireless communication systems.

SUMMARY

The present invention integrates resource allocation between time division duplex (TDD) and frequency division duplex (FDD) in wireless communication systems. A radio network controller (RNC) receives a radio access bearer (RAB) request from a core network or a wireless receive/transmit unit (WTRU). The RNC utilizes a TDD-FDD selector to assign radio resources in response to the request. The TDD-FDD selector evaluates various parameters regarding the received RAB request and determines whether it is preferable to assign TDD resources or FDD resources and whether such resources are currently available. Once resources are assigned, system conditions are evaluated to determine whether optimizations may be made to a current resource allocation.

BRIEF DESCRIPTION OF THE DRAWING(S)

DETAILED DESCRIPTION OF THE PREFERRED EMBODIMENT(S)

Figure 1:
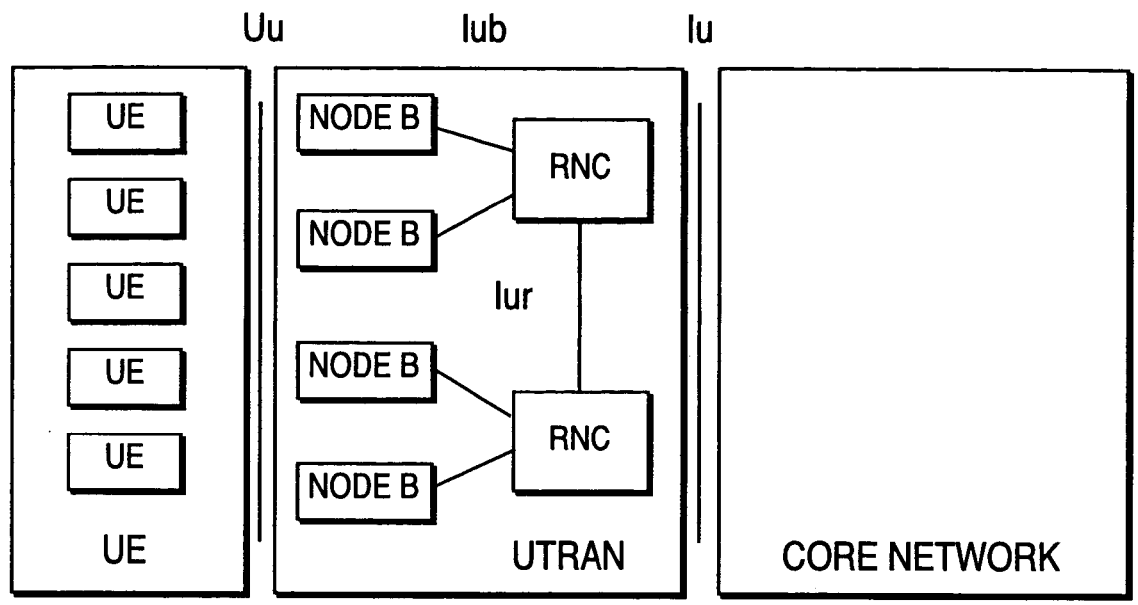
FIG. 1 is a diagram of a typical wireless communication system.

The present invention will be described with reference to the drawing figures wherein like numerals represent like elements throughout.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point, or any other interfacing device in a wireless environment.

Figure 2:
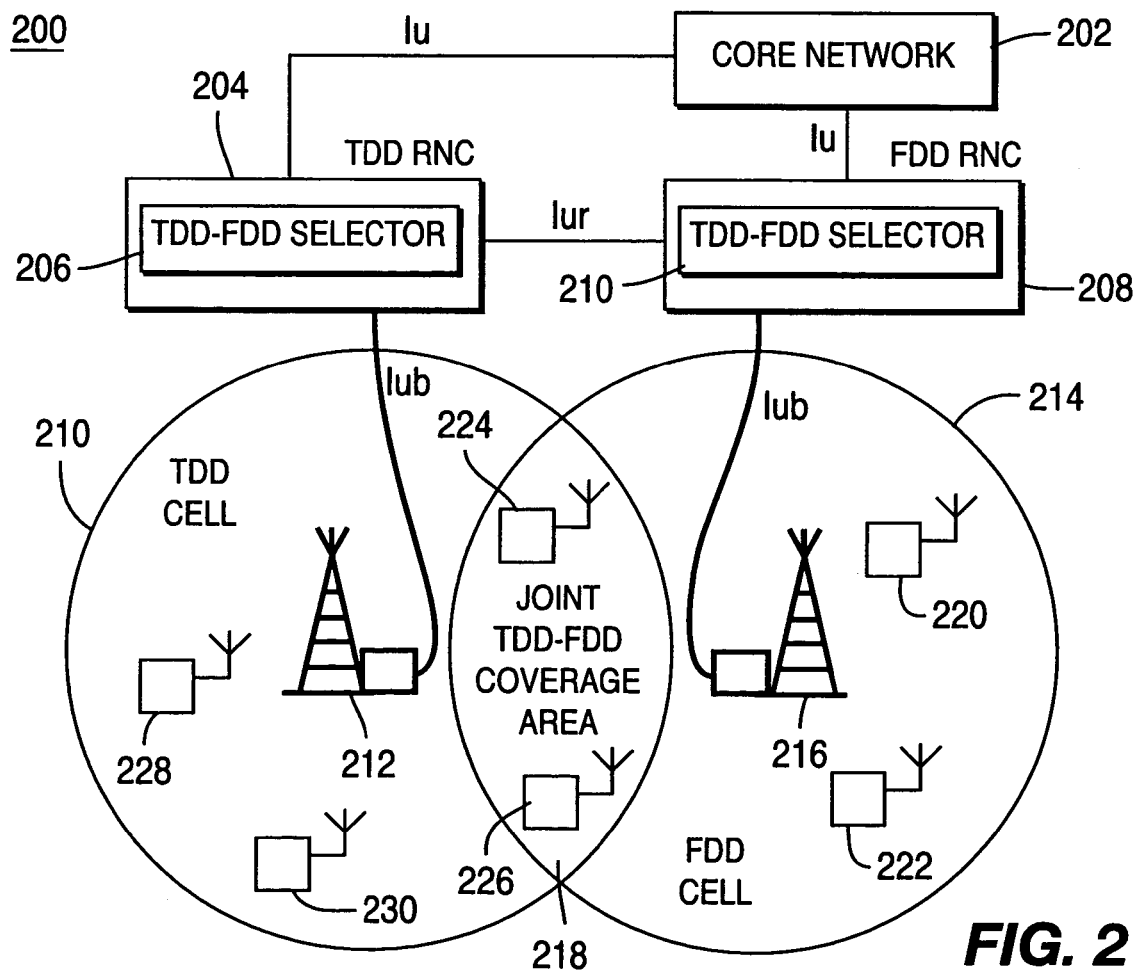
FIG. 2 is a diagram illustrating an embodiment of the present invention wherein a TDD-FDD selector is provided for TDD and FDD type radio network controllers (RNCs).

Referring now to FIG. 2, there is shown a wireless communication system 200 in accordance with the present invention. The system 200 includes a TDD radio network controller (RNC) 204 and a FDD RNC 208 connected to a core network 202. Each RNC 204, 208 controls at least one base station. For example, the TDD RNC 204 controls base station 212. Base station 212 in turn provides a coverage area 210 wherein WTRUs 228, 230 operating within coverage area 210 may be assigned resources from TDD RNC 204. Similarly, the FDD RNC 208 controls base station 216 which in turn provides coverage area 214. WTRUs 220, 222 may be assigned resources from FDD RNC 208. In area 218, there is both TDD and FDD service available to WTRUs 224 and 226. Overlapping coverage areas such as area 218 may be of any size and the particular arrangement shown in FIG. 2 is purely by way of example.

When a radio access bearer (RAB) request (i.e. a call-setup request) is transmitted from a core network or WTRU to an RNC, it is typically transmitted along with a plurality of parameters that provide information regarding how the requested connection will be utilized. Examples of such parameters include, but are not limited to, the degree of symmetry between the uplink and downlink (i.e. symmetry or symmetry status of the requested connection), data transfer rate, frame size, application type, and whether the requested connection is point-to-point, point-to-multipoint, or broadcast. The aforementioned parameters are purely by way of example, as any type of parameter providing information regarding the requested connection may be utilized.

RNCs 204, 208 of the present invention are configured with TDD-FDD selectors 206, 210, respectively. The TDD-FDD selectors 206, 210 may be one or more processors, as desired, for determining the optimal technology type for a received RAB request. That is, based on, for example, parameters provided regarding a RAB request, resource availability, and/or any other relevant considerations, the TDD-FDD selectors 206, 210 work in conjunction with an RNC's existing functionality including its radio resource manager (RRM) to assign resources so that connection requests are assigned resources based on the most efficient system technology type for handling the particular type of connection request. For example, assuming symmetry is the primary consideration, connection requests having symmetrical traffic (i.e. a similar amount of traffic in both the uplink and downlink) are preferably handled by the FDD RNC 208 which, of course, implements FDD technology and is more efficient at handling such traffic. Similarly, connection requests having asymmetrical traffic (i.e. a larger amount of traffic in one direction than the other) are preferably handled by the TDD RNC 204 which, of course, implements TDD technology and is more efficient at handling such traffic.

For example, again where symmetry is the primary consideration, to determine the preferred technology type for a particular received RAB request, a TDD-FDD selector 206, 210 may estimate data rates in the uplink and downlink for the received RAB request. The estimated uplink and downlink data rates may be estimated based on, for example, requested data rate, current traffic conditions, current interference levels, or any other relevant parameters. The TDD-FDD selector 206, 210 may then compare the difference between the estimated uplink and downlink data rates versus a predetermined threshold. If the difference between the estimated uplink and downlink data rates is equal to or above the threshold, the RAB request may be considered asymmetrical (i.e. has an asymmetrical symmetry status) and resources from a TDD RNC 204 may be assigned. If the difference between the estimated data rates is below the threshold, the RAB request may be considered symmetrical (i.e. has a symmetrical symmetry status) and resources from a FDD-RNC 208 may be assigned.

As mentioned above, other parameters including application type and data rate may be evaluated, individually or in combination with symmetry, when determining the optimal technology type for assigning resources based on a received RAB request. For example, where a requested connection is for a voice application requiring real-time transmission, it is preferable for the connection to be provided using the FDD RNC 208. Similarly, for a data application not requiring real-time transmission, it is preferable for the connection to be provided using the TDD RNC 204. In general, if the traffic is very asymmetrical with a high data rate, TDD is preferable. If the traffic is very symmetrical with a fairly low data rate, FDD is preferable. Anything in between may be sent to either TDD or FDD depending on the situation. For example, if TDD cells are congested, it may be desirable to assign a RAB request to FDD regardless of other parameters.

It is noted that, in this embodiment, a RAB request may originate through either a TDD RNC 204 or a FDD RNC 208. In either case, the RNC that received the request makes the decision regarding resource assignment and, where necessary, forwards the RAB request to another RNC type as appropriate so that resources are allocated by an appropriate type of RNC. For example, where a TDD RNC 204 receives a RAB request and determines that it should be handled using FDD type technology, the TDD RNC 204 will transfer the request to a FDD RNC 208 via an Iur interface. The FDD RNC 208 will then handle the request in a normal fashion.

Figure 3:
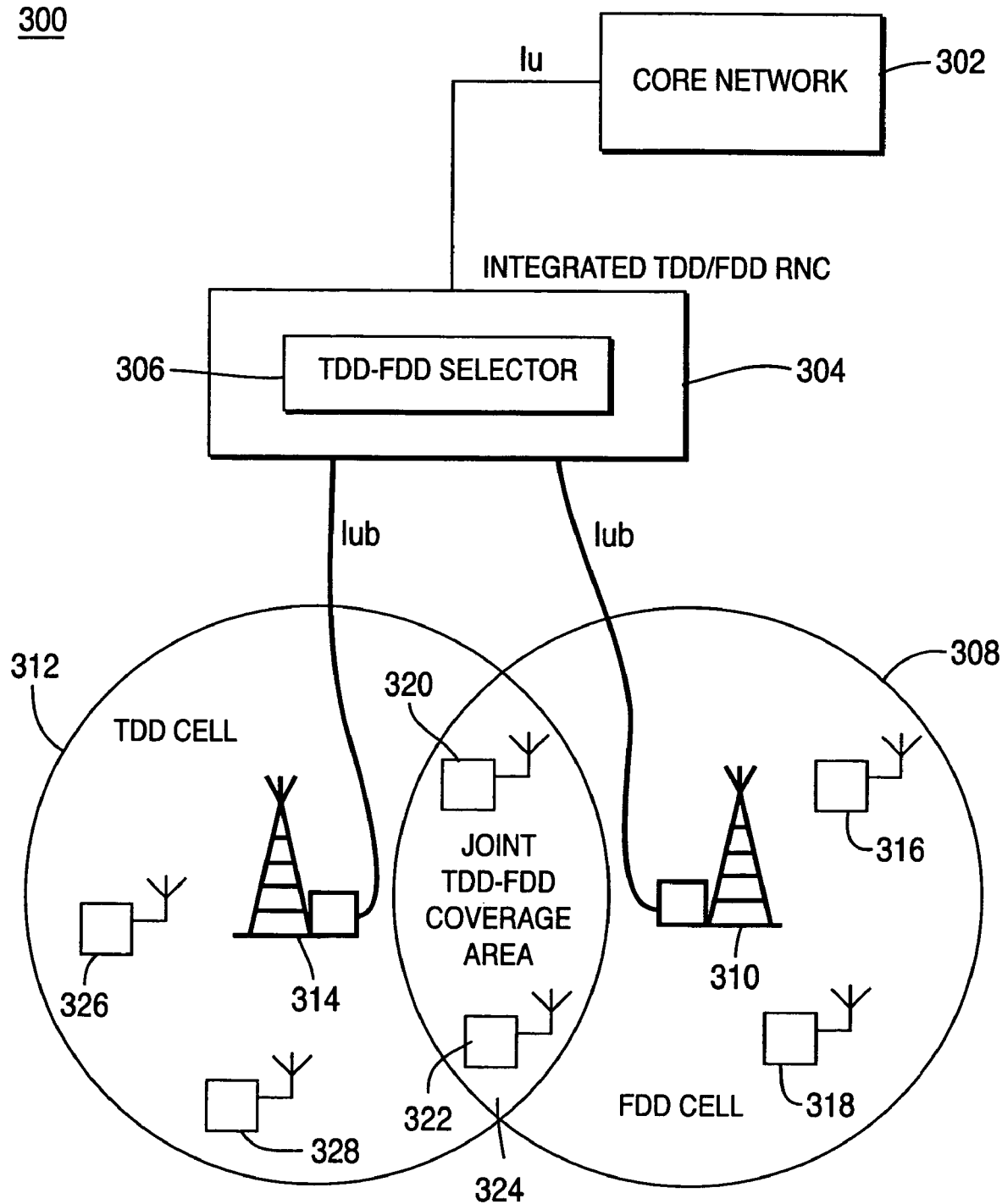
FIG. 3 is a diagram illustrating an embodiment of the present invention wherein a TDD-FDD selector is provided for an integrated TDD/FDD RNC.

Referring now to FIG. 3, in another embodiment of the present invention, an integrated TDD-FDD RNC 304 is provided. The integrated TDD-FDD RNC 304 integrates the conventional functionality of a TDD RNC and a FDD RNC. In this embodiment, therefore, a single TDD-FDD selector 306 is provided. The TDD-FDD selector 306 operates as explained above and determines whether received RAB requests should be handled in TDD mode or FDD mode. As explained above, the TDD-FDD selector may evaluate symmetry, data rate, application type, resource availability, and any other relevant parameters when determining which mode is appropriate for a particular RAB request. For example, since WTRUs 320 and 322 are in a joint coverage area 324, WTRUs 320 and 322 may be assigned resources in either TDD mode or FDD mode, as appropriate.

Figure 4:
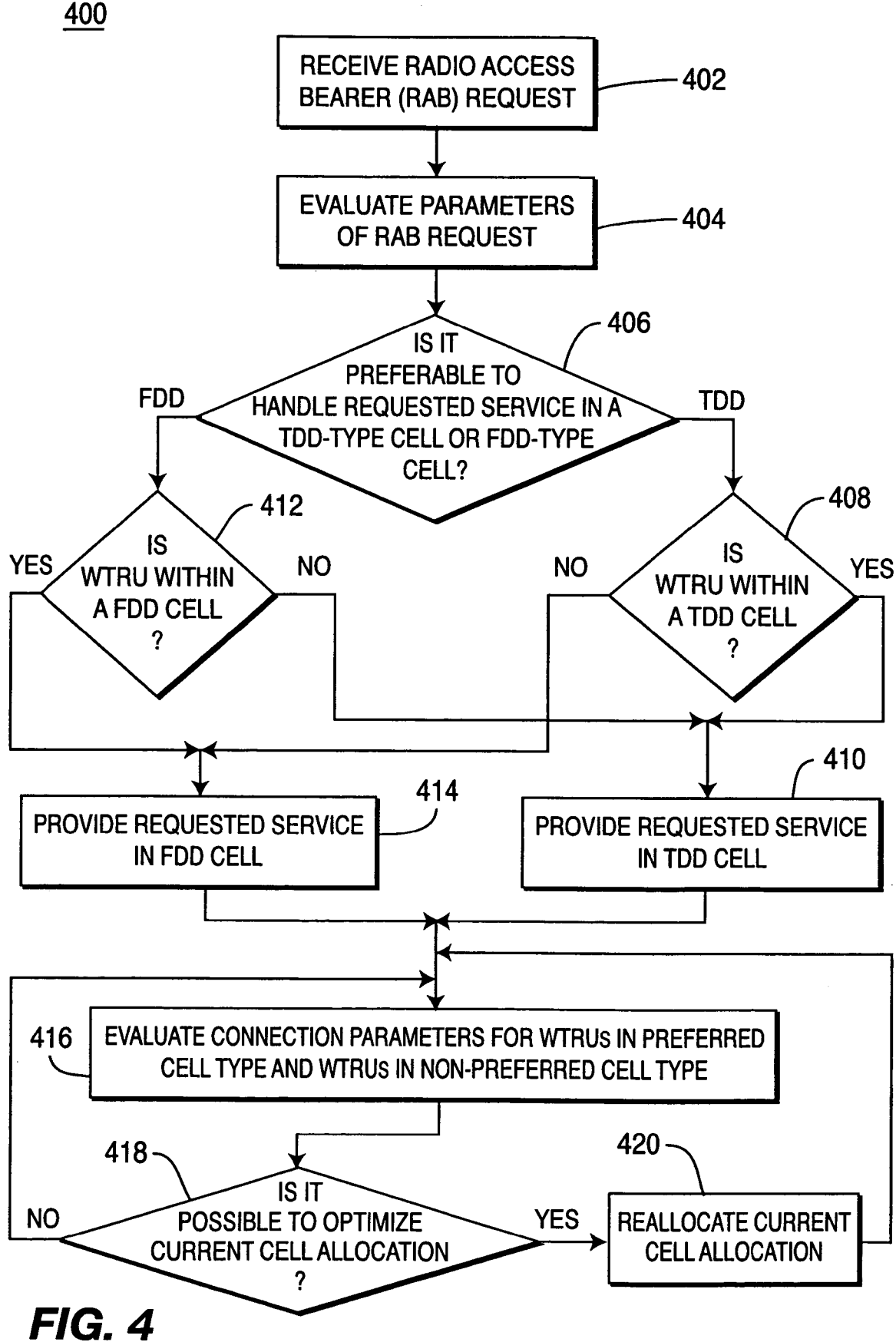
FIG. 4 is a method wherein wireless resources are assigned in accordance with the present invention.

Referring now to FIG. 4, there is shown a method 400 for assigning system resources in accordance with the present invention. The method 400 begins in step 402 when a radio access bearer (RAB) request is received. The request may be received by either a TDD or FDD RNC or, in the case where an integrated TDD/FDD RNC is provided, the request may be received in either FDD mode or TDD mode. Then, in step 404, parameters regarding the received request are evaluated. As explained above, the parameters may be any parameters that provide information regarding the received RAB. Typically, the parameters that are preferably evaluated include symmetry, data rate, and application type.

In step 406, it is determined based on the parameters evaluated in step 404 whether it is preferable to handle the requested service in a TDD type cell or a FDD type cell (i.e. in TDD mode or FDD mode). As previously explained, it is preferable to handle high data rate asymmetrical connections in TDD (i.e. in a TDD cell) while symmetrical lower data rate connections are preferably handled in FDD (i.e. in a FDD cell).

If it is determined that the requested service is preferably handled in a TDD cell, the method 400 proceeds from step 406 to step 408. In step 408, it is determined whether the WTRU that requires the RAB is within a TDD cell. That is, although it has been determined in step 406 that TDD is preferable, step 408 is a confirmation of whether TDD service is in fact currently available. For example, if the received RAB request was issued by a WTRU operating within a TDD cell and it is determined that the request should be handled within a TDD cell, TDD service is obviously available. However, where the received RAB request is issued by a WTRU operating within a FDD cell and it is determined that the request should be handled within a TDD cell, the present invention confirms that TDD service is also available prior to handing the WTRU over from FDD to TDD. Therefore, if in step 408 it is determined that the WTRU is within a TDD cell, the requested service is provided in a TDD cell in step 410. However, if it is determined that the WTRU is not within a TDD cell (i.e. TDD service is not available), the requested service is provided to the WTRU in a FDD cell (step 414). Note in this situation that although the WTRU is not being serviced in a preferred cell (i.e. in a TDD cell), the WTRU will be provided with its requested service in FDD which is the system in which the WTRU was operating when the RAB was requested.

Similar to the above, if in step 406 it is determined that the requested service is preferably handled in a FDD cell, the method 400 proceeds from step 406 to step 412. In step 412, it is determined whether the WTRU that requires the RAB is within a FDD cell. That is, although it has been determined in step 408 that FDD is preferable, step 412 is a confirmation of whether FDD service is in fact currently available. For example, if the received RAB request was issued by a WTRU operating within a FDD cell and it is determined that the request should be handled within a FDD cell, FDD service is obviously available. However, where the received RAB request is issued by a WTRU operating within a TDD cell and it is determined that the request should be handled within a FDD cell, the present invention confirms that FDD service is also available prior to handing the WTRU over from TDD to FDD. Therefore, if in step 412 it is determined that the WTRU is within a FDD cell, the requested service is provided in a FDD cell in step 414. However, if it is determined that the WTRU is not within a FDD cell (i.e. TDD service is not available), the requested service is provided to the WTRU in a TDD cell (step 410). Note in this situation that although the WTRU is not being serviced within a preferred cell (i.e. a FDD cell), the WTRU is provided with its requested service in TDD which is the system in which the WTRU was operating when the RAB was requested.

As mentioned above, once service is being provided to a WTRU in a particular type of cell, that cell will be either a preferred cell or a non-preferred cell with respect to that WTRU. Therefore, once the requested service is being provided, the method 400 proceeds from either step 410 or 414 to step 416. In step 416, parameters regarding the established connection are evaluated to determine whether any optimizations may be performed. For example, where a WTRU was assigned to a TDD cell, but had previously requested a service where it was determined that a FDD cell is preferred, WTRU location may be monitored to determine whether the WTRU moves into a FDD cell or FDD service otherwise becomes available. Existing connections may also be evaluated in step 416 with respect to symmetry (i.e. the connection's symmetry status), data rate, application type, and/or any other relevant parameters to determine whether the type of cell a WTRU is currently operating in, is still the WTRU's preferred cell. That is, while an initial evaluation may lead to a determination that a TDD cell is preferred, conditions or usage may change causing a FDD cell to become preferred. Based on the evaluation(s) performed in step 416, if it is possible to perform any type of optimization (i.e. move a WTRU from one type of cell to another, for example), the method 400 proceeds from step 418 to step 420 and reallocates the current cell allocation as appropriate. Once the reallocation is complete, the method 400 may return to step 416 to look for additional optimizations. If, based on the evaluations of step 416, no optimizations are currently possible, the method 400 may return to directly to step 416 and continue monitoring and evaluating existing connections for purposes of detecting any possible optimizations.

Figure 5:
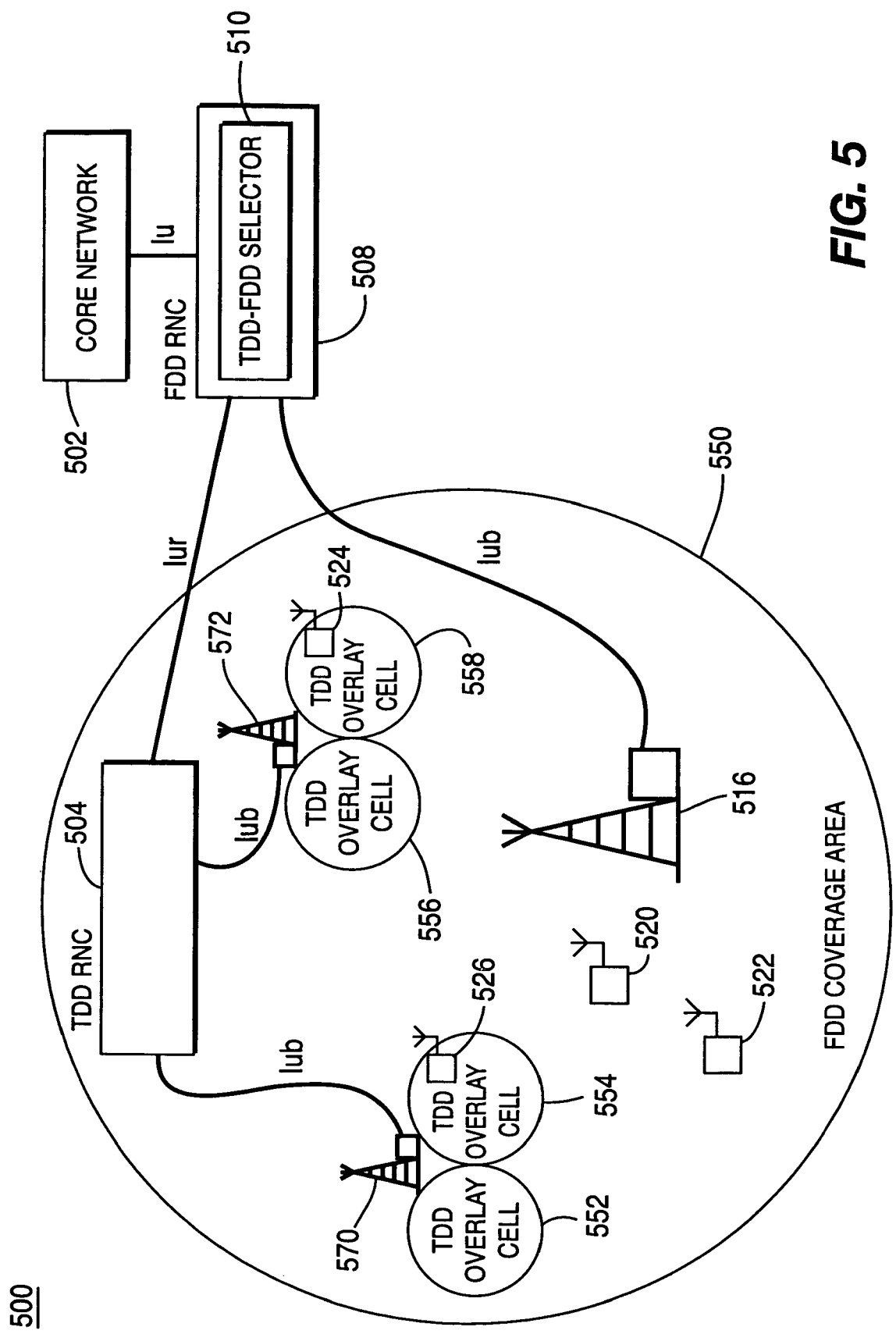
FIG. 5 is a diagram illustrating an embodiment of the present invention wherein TDD and FDD type service may be provided with a single Iu connection between a core network and a FDD RNC.

Referring now to FIG. 5, another embodiment of the present invention is shown. In this embodiment, TDD and FDD RNCs may be provided, but only a single Iu connection to a core network is needed. The Iu connection is provided between the core network and an RNC belonging to the RNC type (i.e. either TDD or FDD) that is the dominant type of technology in the system. That is, the majority of coverage provided by the system may be TDD in which case TDD is the dominant system type and the Iu connection is provided between the core network and a TDD RNC. For purposes of explaining the invention, the system 500 shown in FIG. 5 is a FDD system having a wide area of coverage 550 wherein FDD is the dominant type of technology. Within the FDD coverage area 550 are a plurality of TDD hotspots 552, 554, 556, 558 wherein higher data rates are available.

In system 500, all connections are set up and ended by FDD RNC 508 thereby allowing a single Iu connection to be provided to the core network 502. Therefore, all RAB requests are received by FDD RNC 508 and evaluated by TDD-FDD selector 510, as explained above. Where the selector 510 determines that a particular request should be handled in TDD and TDD service is available (eg. WTRU 524), the connection is transferred to TDD RNC 504 and is handled within the TDD portion (eg. RNC 504, base stations 570, 572) of system 500. That is, typical TDD radio resource management may be used while a WTRU 524 is operating within the TDD portion of system 500. Similarly, where FDD service is preferred or is the only service that is available, typical FDD radio resource management may be used.

Figure 6:
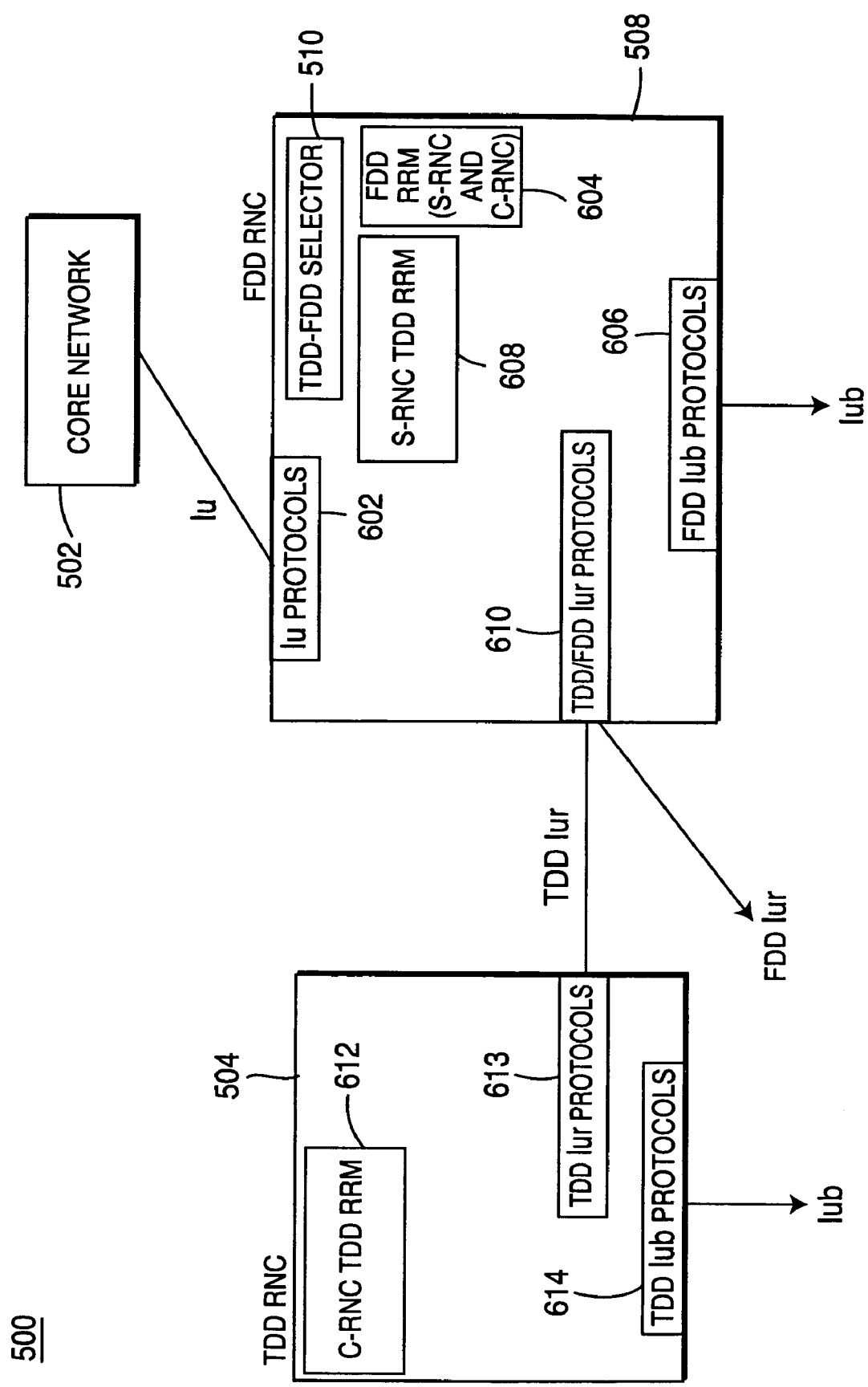
FIG. 6 is a diagram illustrating the configuration of the RNCs shown in FIG. 5.

To initiate and end all traffic (TDD and FDD) through the FDD RNC 508 as explained above, additional functionality is preferably provided in the FDD RNC 508. In a preferred embodiment, the FDD RNC 508 is configured as shown in FIG. 6. The FDD RNC 508 includes a FDD RRM 604 and is configured to perform Iu protocols 602, FDD Iub protocols 606, and FDD Iur protocols 610, as normal. Additionally, the FDD RNC 508 includes a TDD serving radio network controller (S-RNC) radio resource manager (RRM) 608 and is configured to perform TDD Iur protocols 610. It is noted that the additional functionality added to FDD RNC 508 (i.e. TDD SRNC RRM 608 and TDD Iur protocols 610) is similar to the functionality already performed in a typical FDD RNC and may be added, for example, as a software upgrade. The TDD RNC 504 is preferably configured to include a controlling RNC (C-RNC) TDD RRM 612 and is further configured to support TDD Iub protocols 614 and TDD Iur protocols 613, as normal.

Configuring an RNC as shown in FDD RNC 508 allows the configuration of a TDD RNC 504 to be less complex and therefore easier and cheaper to deploy. That is, having a single Iu connection between the core network 502 and the FDD RNC 508 and thereby eliminating the need for the TDD RNC 504 to support Iu protocols allows for quick deployment of TDD networks within a wider area FDD network. In this embodiment, the TDD RNC 504 will never be in a S-RNC mode and therefore also does not need to support the standard functionality of a S-RNC. This is because, as mentioned above, WTRUs operating within the system 500 are always forced to access the FDD RNC 508 at call connection and disconnection. That is, broadcast and access control channels are only set up in the FDD RNC 508 and therefore only when a RAB is assigned by TDD-FDD selector 510 to TDD can a WTRU such as WTRU 524 get into the TDD portion of system 500. Once assigned to the TDD portion of system 500, the WTRU 524 operates as normal within the TDD coverage areas and is handed over between TDD cells or back to the FDD RNC 508 as appropriate. The handover decisions between TDD cells in handled in accordance with standard TDD functionality while decisions on whether a WTRU should be handed back to a FDD RNC area is preferably determined by the TDD-FDD selector 510.

It is noted that while only one RNC of each RNC type (i.e. FDD and TDD) are shown in describing the present invention, any number of TDD RNCs and FDD RNCs may be provided. In such arrangements, RNCs of the same type communicate as normal using their respective Iur protocols. It is also noted that the various functions and protocols described herein, either individually or collectively, may be performed using any number of processors as desired.

It is important to note that the present invention may be implemented in any type of wireless communication system employing any type of time division duplex (TDD) technology or any type of frequency division duplex (FDD) technology, as desired. By way of example, the present invention may be implemented in UMTS-TDD, UMTS-FDD, TDSCDMA, or any other similar type of wireless communication system. Further, while the present invention has been described in terms of various embodiments, other variations, which are within the scope of the invention as outlined in the claim below will be apparent to those skilled in the art.

What is claimed is:

1. A method for integrating time division duplex (TDD) and frequency division duplex (FDD) in wireless communication systems, the method comprising the steps of:

receiving radio access bearer (RAB) requests at a radio network controller (RNC) along with a plurality of parameters regarding the request;

estimating at the RNC a degree of symmetry in uplink (UL) and downlink (DL) connections required to support communication associated with the RAB requests;

selecting either a TDD connection for both UL and DL or a FDD connection for both the UL and DL based on the estimated symmetry of the UL and DL connections, wherein a difference is calculated between a data rate on the uplink and a data rate on the downlink and TDD is selected where said difference is greater than a predetermined threshold and FDD is selected where the difference is not greater than the predetermined threshold.

2. The method of claim 1 wherein FDD connection is selected for RAB requests associated with voice applications.

3. The method of claim 1 further comprising: evaluating a symmetry status of the UL and DL connections periodically once an initial connection has been established in response to a RAB request; and switching between TDD and FDD modes based on said symmetry status.

4. The method of claim 1 wherein all RAB requests are processed through a FDD RNC.

5. The method of claim 4 wherein only the FDD RNC is connected to a core network through an Iu interface, and a TDD RNC is indirectly connected to the core network through the FDD RNC.

6. The method of claim 5 wherein the FDD RNC performs all call connections and disconnections.

7. A system for integrating TDD and FDD in a communication system, the system comprising:

a core network (CN);

a time division duplex radio network controller (TDD RNC);

a frequency division duplex radio network controller (FDD RNC); and, a TDD-FDD selector configured to receive a RAB request and to estimate a symmetry of data rates between uplink (UL) and downlink (DL) connections that is required to support the RAB assignment request and to calculate a difference between a data rate on the uplink and a data rate on the downlink, and to make a decision to assign radio resources in either TDD mode for both UL and DL or FDD mode for both UL and DL based on the estimated symmetry of data rates between UL and DL connections, wherein TDD is selected where the difference of data rates between UL and DL connections is greater than a threshold and FDD is selected where the difference of data rates between UL and DL connections is not greater than the threshold.

8. The system of claim 7 wherein a FDD connection is selected for RAB requests associated with voice applications.

9. The system of claim 7 wherein the TDD RNC, the FDD RNC, and the TDD-FDD selector are integrated into an integrated TDD/FDD RNC.

10. The system of claim 7 wherein the FDD RNC includes a TDD serving radio network controller (S-RNC) and is configured to support TDD Iur protocols.

11. The system of claim 10 wherein only the CN and the FDD RNC are connected via an Iu interface and RAB requests are processed through the FDD RNC.

* * * * *

UNITED STATES PATENT AND TRADEMARK OFFICE
CERTIFICATE OF CORRECTION

PATENT NO. : 7,248,567 B2
APPLICATION NO. : 10/828665
DATED : July 24, 2007
INVENTOR(S) : Desgagné et al.

It is certified that error appears in the above-identified patent and that said Letters Patent is hereby corrected as shown below:

At column 2, line 28, after the word "serving", delete "networks" and insert therefor --network's--.

At column 7, line 32, before the word "directly", delete "to".

At column 8, line 39, after the words "TDD cells", delete "in" and insert therefor --is--.

At column 8, line 45, after "FDD", delete "are" and insert therefor --is--.

Signed and Sealed this

Eighteenth Day of December, 2007

JON W. DUDAS
*Director of the United States Patent and Trademark Office*